Patented Nov. 23, 1948

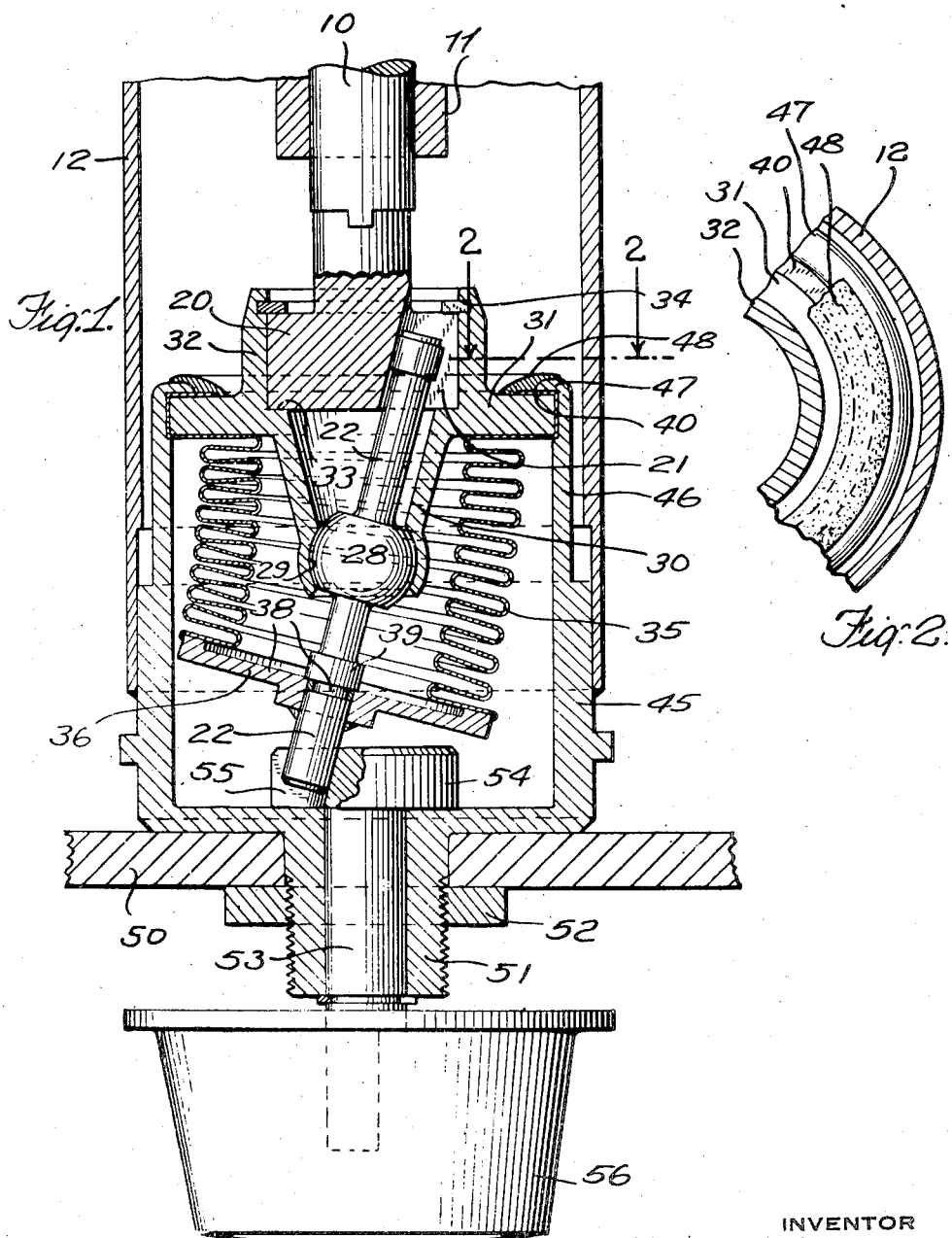

2,454,340

UNITED STATES PATENT OFFICE 2,454,340

SEALED TRANSMITTING MECHANISM

Wladimir A. Reichel, Hackensack, N. J., assignor, by mesne assignments, to Kearfott Company, Inc., New York, N. Y., a corporation of New York Application July 18, 1945, Serial No. 605,743

3 Claims. (Cl. 286—29)

1

This invention relates to a fluid tight coupling for transmitting motion to the interior of a closed casing without leakage and more particularly to a coupling for connecting an adjusting or control member to an element within the casing.

The invention is applicable to a coupling or transmitting member in the form of a lever or shaft pivoted intermediate its ends for universal movement and connected to a flexible bellows which seals the casing. The movable end of the bellows has a fixed relation to the shaft and the shaft is driven by the external member such as an adjusting knob.

In accordance with this invention the bellows is so related to the sealed chamber that its interior forms a part of the chamber and the free end is driven externally by the input movement of a crank or eccentric to which the shaft is connected externally of the bellows. The bearing for the shaft is disposed well within the bellows toward its free end, so as to impose slight lateral or swaying movement to the bellows in following the crank.

In a device of this type, the interior of the housing for the bellows is in communication with the atmosphere and the fixed end of the bellows has a sealed connection with the sealed end of the housing. The plate which provides the fixed support for the bearing hermetically closes the housing at this end, and a problem arises in connection with the sealing of the bellows in its fixed connection and also sealing the joint between the plate and the housing. The bellows is of metal, such as bronze or Monel, for example, and these joints may be and usually are soldered. If the two joints are separately soldered, there is the danger that the heat of the second soldering operation will soften and destroy the seal of the first soldered seam.

It is accordingly an object of the present invention to overcome this difficulty and provide a positive and reliable seal.

Another object is to provide a device of the above type having novel and improved details of construction and features of operation.

Other specific objects and advantages will be apparent as the nature of the invention is more fully disclosed.

In one embodiment of my invention I provide a positive seal by so constructing and arranging the parts that both the bellows and the bearing plate are secured by a single soldered joint or seam. Hence only a single soldering operation is involved and there is no possibility of the seam becoming softened by the heat of a later operation.

Although the novel features which are characteristic of this invention are pointed out more particularly in the claims, the nature of the invention will be better understood by referring to the following description, taken in connection with the accompanying drawing in which a specific embodiment has been set forth for purposes of illustration.

In the drawing:

Fig. 1 is a longitudinal section through a coupling member embodying the invention, and Fig. 2 is a partial section on an enlarged scale taken on the line 2—2 of Fig. 1.

Referring to the drawing more in detail, the invention is shown as applied to a coupling member for a shaft 10 which is journaled in bearings 11 in a casing 12 which forms a part of any closed casing which is to be maintained in fluid tight condition.

The shaft 10 is coupled in any suitable way, shown as a tongue and slot connection, to a bushing 20 that constitutes a crank member. This bushing has an eccentric slot 21 in which the driving end of the nutatory lever or shaft 22 engages.

The shaft 22 is provided with a spherical bearing member 28 which bears in a complementary socket 29 for universal movement. The socket 29 is formed in a bracket 30 carried by a bearing plate 31 having a boss or neck 32 in which the bushing 20 is journaled. The bushing 20 is secured between a shoulder 33 in the bearing plate 31 and a retaining ring 34 held in the boss 32.

A flexible accordion type bellows 35 of suitable metal is attached at one end to a head 36 having a boss through which the end of the shaft 22 protrudes and in which it is fastened and hermetically secured, as by solder or welding. The other end of the bellows embraces and is flanged over the bearing plate 31 to form a sealing flange 40.

The casing 12 is formed with an opening to receive the coupling members in which a housing 45 is secured and sealed, as by solder or welding. The housing 45 is generally of cup shape and has an inner cylindrical part 46 the end of which is reduced in diameter near its open end to form an internal shoulder, as shown, upon which the bearing plate 31 with the embracing end of the bellows, is seated. The extreme end of the cylindrical housing wall is flanged over the bearing plate and turned down upon the bellows flange 40, forming an overlapping flange 47 which terminates somewhat short of the inner edge of the bellows flange 40. The flanges 40 and 47 are both sealed to the bearing plate 31 by a single ring of solder 48, which, because of the exposed portion of the flange 40, seals the bellows flange both to the housing and the plate, so that the bellows 35 and cylindrical part 46 of the housing 45, through the plate 31, form a permanent and complete seal for the casing 12, by a joint which requires but a single soldering operation.

The housing 45 is shown as mounted on a panel 50 by means of an externally screw threaded hollow boss 51 which extends through the panel 50 and is secured by a nut 52. An adjusting shaft 53 extends through the boss 51 and carries on its inner end a disc 54 having an eccentric slot 55 into which the protruding end of shaft 22 extends. The shaft 53 carries on its outer end an adjusting knob 56. If the casing 12 is small the entire device may be supported by the panel 50.

In operation, as the knob 56 is turned the eccentric slot 55 of the disc 54 drives the obliquely disposed shaft 22 and causes its two ends to describe a circular path, the intermediate pivoted bearing being such as to permit the shaft to partake of the nutatory movement without rotating on its axis. The inner end of the shaft 22 drives the bushing 21 and causes the shaft 10 to rotate. The shaft 10 thus moves with the knob 56.

In the form shown the bearing 29 is located relatively close to the free end of the bellows, and, since the interior of the bellows is connected with the sealed chamber, the head 36 is at the drive end of the transmission. As a consequence, the amount of distortion of the bellows is reduced and the life of the coupling is greatly increased. It is also to be noted that the rigid housing 45 clamps the end of the bellows against the bearing plate 31 and thus prevents any movement of the bellows from being transferred to the flange 40 and loosening the soldered joint. The construction is simple and dependable and provides a long life without loss of sealing qualities.

Although a specific embodiment has been shown and described for purposes of illustration, it is to be understood that the invention is not restricted thereto but that various changes and adaptations will be apparent to one skilled in the art. The invention is only to be limited in accordance with the scope of the following claims.

I claim:

1. A fluid tight motion transmission coupling for making external connection to a rotative part within a casing, comprising a housing, a bearing plate fitting within and closing one end of the housing, a flexible bellows having a head sealed to one end and having its other open end entered within the joint between the housing and the plate and flanged over the edge of the plate outside the joint, a ring of solder applied externally at the joint and hermetically sealing the joint and securing the open end of the bellows both to the plate and the housing, the bearing plate having a bracket extending into the bellows and terminating in a spherical bearing, a nutatory shaft having a spherical part intermediate its ends mounted in the bearing, one end of the shaft being adapted for connection through the plate to the rotative part and the other end of the shaft protruding through the said head and being fastened and sealed thereto, a driving shaft journaled in the other end of the housing, and means eccentrically connecting the driving shaft with the protruding end of the nutatory shaft.

2. A fluid tight motion transmission coupling for making external connection to a rotative part within a casing, comprising a cylindrical housing, a circular bearing plate fitting within an end of the housing, a flexible bellows having a head sealed to one end and having its other open end entered within the joint between the housing and the plate and flanged over the edge of the plate outside the joint, the extreme portion of the housing wall at said end being turned in upon the flange of the bellows over the plate but terminating short of the inner edge of the said flange, the external overlapping joint thus formed being covered and sealed with a single sealing ring sealing the overlapping edge of the housing wall to the bellows flange and sealing the bellows flange to the face of the bearing plate, the bearing plate having a bracket extending into the bellows and terminating in a spherical bearing, a nutatory shaft having a spherical part intermediate its ends mounted in the bearing, one end of the shaft being adapted for connection through the plate to the rotative part and the other end of the shaft protruding through the said head and being fastened and sealed thereto, a driving shaft journaled in the other end of the housing, and means eccentrically connecting the driving shaft with the protruding end of the nutatory shaft.

3. A fluid tight motion transmission coupling for making external connection to a rotative part within a casing, comprising a cylindrical cup shaped housing having its internal diameter for a portion at its open end increased to form an internal shoulder, a circular bearing plate fitting within the open end of the housing and seated upon said shoulder, the end of the housing wall extending beyond the plate, a flexible bellows having a head sealed to one end and having its other open end entered within the joint between the housing wall and the plate and flanged over the edge of the plate outside the joint, the extending portion of the housing wall being turned in upon the flange of the bellows over the plate and terminating short of the inner edge of the flange, the external overlapping joint thus formed being covered and sealed with a single sealing ring sealing the overlapping edge of the housing wall to the bellows flange and sealing the bellows flange to the face of the bearing plate, the bearing plate having a bracket extending into the bellows and terminating in a spherical bearing, a nutatory shaft having a spherical part intermediate its ends mounted in the bearing, one end of the shaft being adapted for connection through the plate to the rotative part and the other end of the shaft protruding through the said head and being fastened and sealed thereto, a driving shaft journaled in the other end of the housing, and means eccentrically connecting the driving shaft with the protruding end of the nutatory shaft.

WLADIMIR A. REICHEL.

REFERENCES CITED

The following references are of record in the file of this patent:

UNITED STATES PATENTS

| Number | Name | Date |
| --- | --- | --- |
| 1,702,762 | Brubaket | Feb. 19, 1929 |
| 2,099,385 | Ciamberlini | Nov. 16, 1937 |